April 14, 1970     R. EINEMAN, JR., ET AL     3,506,305
VEHICLE SAFETY BELT WARNING SYSTEMS
Filed Jan. 16, 1968
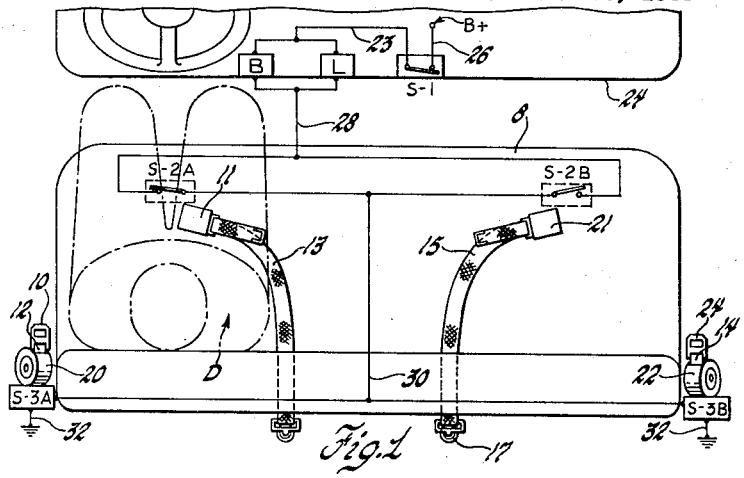
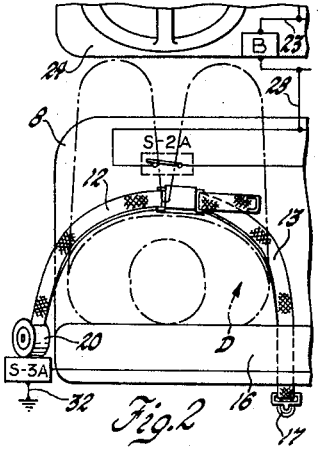
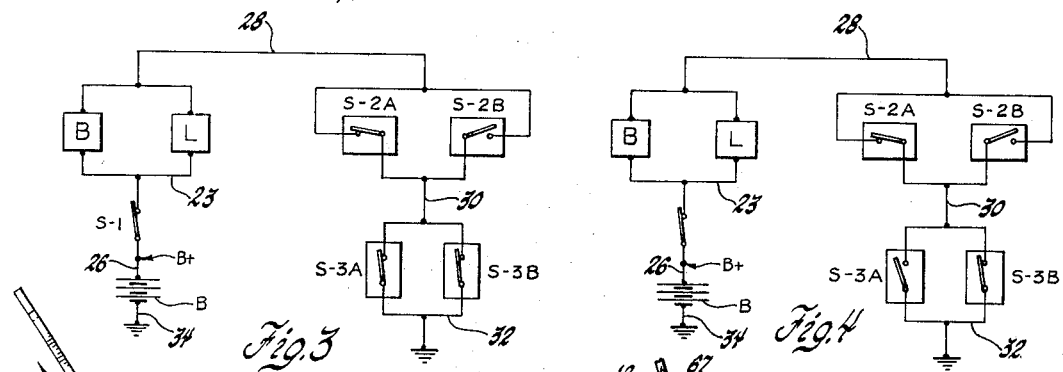
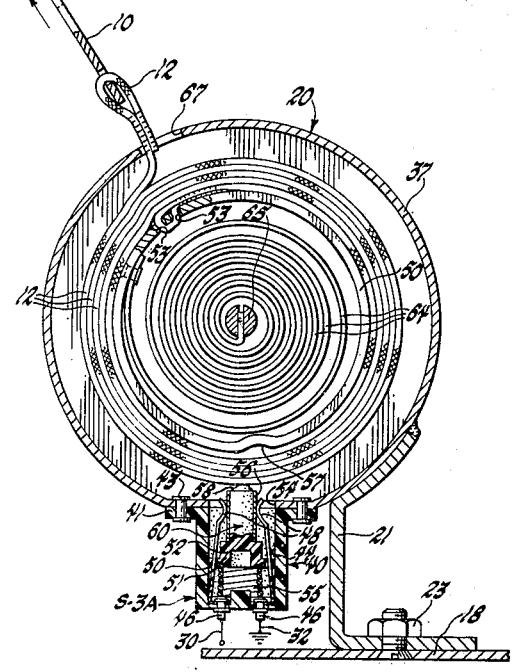
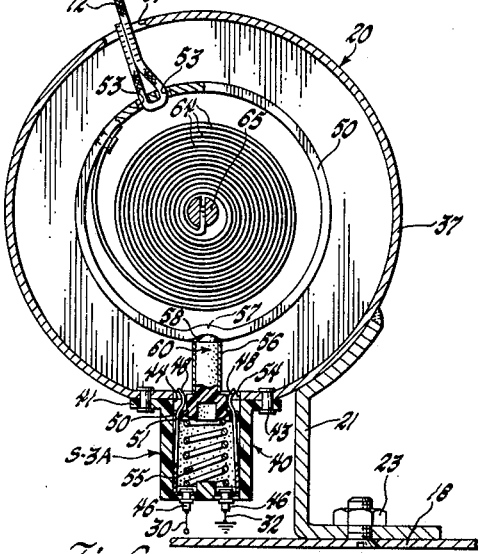
Ralph Eineman Jr. &
Harold A. Rambow
JOINT INVENTORS
BY William L. Fisher Esq.
THEIR PATENT ATTORNEY

United States Patent Office 3,506,305
Patented Apr. 14, 1970

3,506,305
VEHICLE SAFETY BELT WARNING SYSTEMS
Ralph Eineman, Jr., 26,621 W. Davison, Redford, Mich. 48219, and Harold A. Rambow, 21159 Flanders, Farmington, Mich. 48024
Filed Jan. 16, 1967, Ser. No. 609,472
Int. Cl. B60r 21/10; A62b 35/00, 35/02
U.S. Cl. 297—388                    4 Claims

ABSTRACT OF THE DISCLOSURE

A vehicle safety belt warning system is disclosed comprising, in combination, a retractable safety belt of the roll-up type, a retracting mechanism therefor having a reel, said reel having a fully empty position corresponding to the fully extended position of said safety belt, and electrical switch means associated with said retracting mechanism, said switch means open by said reel being empty and closed by movement of said reel from its said fully empty position upon any retraction of said safety belt from its said fully extended position.

---

Our invention relates to improvements in vehicle safety belt warning systems.

Its principal object is the provision of an improved system of the type mentioned which is virtually foolproof in effecting full and proper utilization of furnished safety belts while being so economical and reliable as to be conducive of widespread adoption.

The foregoing object of our invention and its advantages will become apparent during the course of the following description, taken in conjunction with the accompanying drawings, in which:

FIGS. 1 and 2 are plan views of portions of the interior of an automotive vehicle equipped with our safety belt warning system showing in FIG. 1 unfastened seat belts and in FIG. 2 the driver's seat belt fastened;

FIGS. 3 and 4 are electrical circuit diagrams for said warning system showing conditions thereof corresponding, respectively, to FIGS. 1 and 2; and FIGS. 5 and 6 are side elevational views, partly in section, of electrical switching mechanism showing conditions thereof corresponding, respectively, to FIGS. 1 and 2.

Referring to the drawings in greater detail, 8 designates the front seat of an automotive vehicle which is equipped with a pair of seat belts 12 and 13 for the driver and a like pair 14 and 15 for the front seat passenger. The inside belts 13 and 15 are adjustable in length but not retractable and extend beneath the back rest 16 (FIG. 2) to the floor 18 (FIGS. 5 and 6) of the vehicle where they are suitably anchored as shown and indicated at 17 for the belt 15. Said inside belts 13 and 15 are equipped with socket type buckles 11 and 21, respectively, of well known construction which are adjustable to take up any slack in the buckled seat belt length. The outside belts 12 and 14 are not adjustable in length, extend beyond the seat 8 and are retractable into housing 20 and 22, respectively, which are suitably anchored to the vehicle floor 18 as shown and indicated at 21 and 23 for the housing 20 in FIGS. 5 and 6. Said outside belts 12 and 14 are equipped with spade type buckles 10 and 24, respectively, and are always fully extended from their retracted positions when the seat belt is properly buckled.

In accordance with our invention we provide a buzzer B or light L, or both, suitably mounted on the vehicle dash 24, a pair of conventional pressure switches S–2A and S–2B within the seat 10 and a pair of belt tension sensing switches of our own design exclusively adjacent the retractable belts 12 and 14. The buzzer B and light L, if both are used, are connected in parallel with each other and on one side by the electrical line 23 through the vehicle ignition switch S–1 and the line 26 to B+ or the positive side of the vehicle battery B. The other side of the buzzer B and light L is connected by the line 28 to one side of the pair of pressure switches S–2A and S–2B which are connected in parallel with each other. The other side of the pair of pressure switches S–2A and S–2B is connected by the line 30 to one side of the pair of sensing switches S–3A and S–3B which are also connected in parallel with each other. The other side of the pair of sensing switches S–3A and S–3B is connected by the line 32 to ground or the negative side of the battery B since the latter is grounded as shown by the line 34.

The pair of pressure switches S–2A and S–2B are normally open and are located vertically so as to be actuated closed by the depression of the portions of the top of the seat 8 corresponding, respectively, to the sitting pressure areas, of the driver D and the front seat passenger (not shown). Said pair of switches S–2A and S2B are located widthwise of the vehicle so as to be centered in said sitting pressure areas and lengthwise of the vehicle forwardly of the back rest 16 a sufficient distance as shown so as not to be actuated by packages resting on the seat 10 against the back rest 16, but still within said sitting pressure areas.

The pair of switches S–3A and S–3B are constructed in relation to their respective belts as shown for the switch S–3A and its corresponding belt 12 in FIGS. 5 and 6. As shown in these figures the switch S–3A is mounted on and beneath the housing 20 on a flattened portion of the outer cylindrical shell 37 of said housing 20 to which portion the cylindrical body 40 of the switch S–3A is made fast as by the flange 41 thereon and fastening means 43 as shown. The switch body 40 is hollow as shown to provide a cylindrical chamber 44 open at one end and closed at the other through which extend connectors 46 individually connected externally of the switch S–3A to the lines 30 and 32. Internally of the switch S–3A the connectors 46 serve to anchor and electrically connect a pair of spring metal contactor arms 48 having arcuately shaped free ends as shown. The arms 48 extend through diametric slots 50 formed in a flange on the bottom of a plunger 60 which is slidably carried in the chamber 44. The plunger 60 operates centrally in respect to the length axially of the housing 20 and through an aperture 54 in said flattened portion on the shell 37. The plunger 60 is normally biased by a wire compression spring 55 out of the open end of the chamber 44 and into the interior of the housing 20. By virtue of the bend imparted to the contactor arms 48 and their own spring constant their free ends are biased toward each other so that they make (except in the extreme position of the plunger 60) continual contact with a metal sleeve 56 pressed on the spindle portion of the plunger 60.

The plunger 60 is actuated into its extreme inward position (in respect to the switch body 40) by the retraction of the belt 12 into the housing 20 which is accomplished by rotation (in an anti-clockwise direction as viewed in FIGS. 5 and 6) of a drum 50 which is suitably journaled for rotation within the housing 20 by means (not shown) such as the opposite ends of said housing 20. The inner end of the belt 12 is anchored on the drum 50 by being reversely threaded through a pair of spaced slots 53 therein and by being sewn as shown. The drum 50 is provided with a depression 57 at the point where it is engaged by the outer end of the plunger 60. In this way the plunger 60 is depressed immediately and upon any significant retraction of the belt 12 in the housing 20 and sufficiently so that the contactor arms 48 contact the metal sleeve 56 and close the switch S–3A in this event. The outer end of the plunger 60 is provided with a flat angular cam surface 58 which reduces thrust on the plunger 60 as it is depressed during the wrapping around of said belt 12 on the drum 50 and upon winding of said belt upon itself as shown in FIG. 5. As the belt 12 is extended from its fully retracted position shown in FIG. 5 the plunger 60 is biased outwardly (in respect to the switch body 40) by the spring 55 into its extreeme outward position. In this position the free ends of the contactor arms 48 are spread apart the maximum amount so that they cannot contact the metal sleeve 56 and instead are pressed against an insulated integral hub portion on the plunger 60 between the flange thereon and the sleeve 56. In this position of the plunger 60 the switch S–3A is open. In every other position of the plunger 60 and during movement thereof the switch S–3A is closed by virtue of the aforementioned continual contact between the sleeve 56 and the free ends of the contactor arms 48. The belt 12 is extended from the housing 20 by the driver D who usually pulls upon the spade buckle 10 fastened to the free end thereof. The drum 50 is rotated by a coiled flat spring 64, one end of which is anchored in an axial shaft 65 the other end of which is fastened to the drum 50. The shaft 65 is made fast in respect to the housing 20 as by being supported by well known means (not shown) such as the opposite ends of said housing 20. In moving into and out of the housing 20 the belt threads through a slot 67 in the outer shell 37.

In operation of our vehicle safety belt warning system as described the ignition switch S–1 must be energized or in "on" position. As soon as a user, such as the driver D, sits on his respective sitting pressure area the corresponding pressure switch such as the switch S–2A becomes closed by depression of the top of the seat 8. As long as there is no user sitting in any given seat such as the front passenger seat shown in FIG. 1 the respective pressure switch, such as the switch S–2B, will remain open. Because of the open condition of the switch S–2B no current will flow through the parallel path in which it is located irrespective of the condition of its corresponding sensing switch S–3B. On the other hand, because of the actuated closed condition of the pressure switch S–2A due to the seated weight of the driver D and by virtue of the normally closed condition of the corresponding sensing switch S–3A the buzzer B will be energized and emit a warning sound. In the same manner the light L well be energized and emit a warning light. The warning sound and/or warning light will continue to be emitted so long as the seat belt 12 is not fully extended from the housing 20 but will terminate when the belt is so extended because of the actuated open condition of the sensing switch S–3A. For all practical purposes if there is an occupant of the particular seat, such as the driver D, the only way the respective retractable belt, such as the belt 12 can be maintained in an extended condition is by buckling of the same as by fastening the belt 12 with the belt 13 about the body of the driver D as shown in FIG. 2. If there is any slack in the buckled seat belt, as for example from a smaller or thinner occupant using the belt as adjusted for a larger or heavier prior occupant or from not having the same adjusted tightly or for any other reason, retraction of the retractable belt will occur and its corresponding sensing switch will close immediately (particularly by virtue of the means 57 on the drum 50) upon such retraction causing said warning signal to be emitted. With our warning system it is difficult to imagine how except through a malfunction or a deliberate interference its purpose can be defeated.

It will thus be seen that there has been provided by our invention an improved vehicle safety belt warning system in which the object hereinabove set forth, together with many thoroughly practical advantages, has been successfully achieved. It should be understood that variations and changes may be resorted to without departing from the spirit of our invention as defined by the appended claims. For example, any number and location of occupants may be served by said system in which case the warning signal may be common (as previously shown and described) to all such occupants in that the conditions of the safety belt of any one occupant may cause emission of said warning signal. Also the switch S–3A and the associated housing 20 may be located above and behind the driver so as to be operative in the case where the belt 12 is used as a shoulder or chest safety belt instead of a seat belt as shown and described. Also the switch S–2A may be located within the back rest 16 so as to be actuated by the back of the driver D.

What is claimed is:

1. Vehicle safety belt warning means comprising, in combination, a retractable safety belt of the roll-up type, a retracting mechanism therefor having a reel, said reel having a fully empty position corresponding to the fully extended position of said safety belt, and electrical switch means associated with said retracting mechanism, said switch means open by said reel being empty and closed by commencement of movement of said reel from its said fully empty position upon any retraction of said safety belt from its said fully extended position, said switch means having a plunger moveable between a retracted position and an extended position, said switch means closed during movement of the plunger between said retracted and extended positions thereof, said switch means closed in said retracted position thereof and open in said extended position thereof.

2. Vehicle safety belt warning means as claimed in claim 1, said plunger in said extended position thereof in engagement with said reel in the empty position of said reel.

3. Vehicle safety belt warning means as claimed in claim 2 in which said reel is provided with means on its drum surface in which said plunger is engaged in its said extreme extended open position.

4. For use with a vehicle having a seat for an occupant and a retractable safety belt of the roll-up type associated with said seat for assisting in holding the occupant in place therein, the improvement comprising electrical switch means associated with the retracting mechanism for said safety belt, said switch means open by full extension of said safety belt from its retracted position and closed by any retraction thereof from said retracted position, said switch means comprising a spring metal contact member, a moveable plunger, a metal sleeve carried by the plunger, said contact member biased into electrical contact with said sleeve during movement of said plunger except into an extreme extended position of the latter, said contact member spaced from and out of electrical contact with said sleeve in said extreme extended position of said plunger.

References Cited

UNITED STATES PATENTS

| | | | |
|---|---|---|---|
| 3,340,523 | 9/1967 | Whitman | 340—278 |
| 3,381,268 | 4/1968 | Boblitz | 340—52 |
| 1,724,912 | 8/1929 | Cubitt et al. | 340—278 |
| 2,824,293 | 2/1958 | Meinhardt | 340—278 |
| 3,074,055 | 1/1963 | Rudolph et al. | 340—278 |
| 3,154,167 | 8/1964 | Butler et al. | 180—82 |
| 3,185,246 | 5/1965 | Maurer et al. | 180—82 |
| 3,226,674 | 12/1965 | Eriksson | 340—53 |
| 3,281,818 | 8/1966 | Morgan et al. | 340—278 |
| 3,294,339 | 12/1966 | Fontaine. | |

JAMES T. McCALL, Primary Examiner

U.S. Cl. X.R.
180—82; 340—52, 278; 242—107